(12) United States Patent
Kim

(10) Patent No.: US 7,783,678 B2
(45) Date of Patent: Aug. 24, 2010

(54) METHOD FOR AUTOMATING SOFTWARE MANUFACTURING PROCESS BASED ON USER INTERFACE FORM DESIGN, AND COMPUTER READABLE MEDIUM RECORDING COMPUTER EXECUTABLE INSTRUCTION FOR PERFORMING THE SAME

(76) Inventor: Giloong Kim, #5-801, Hyundai Prime APT, Guui-3dong, Gwangjin-gu, Seoul (KR) 143-203

( * ) Notice: Subject to any disclaimer, the term of this patent is extended or adjusted under 35 U.S.C. 154(b) by 160 days.

(21) Appl. No.: 11/413,939

(22) Filed: Apr. 27, 2006

(65) Prior Publication Data

US 2006/0259506 A1    Nov. 16, 2006

(30) Foreign Application Priority Data

May 12, 2005    (KR) ............... 10-2005-0039776

(51) Int. Cl.
*G06F 7/00* (2006.01)
*G06F 17/30* (2006.01)

(52) U.S. Cl. .................................................. 707/805

(58) Field of Classification Search ............ 707/1, 707/2, 3, 4, 6, 7, 9, 10, 100, 101, 102, 200, 707/805, 999.102
See application file for complete search history.

(56) References Cited

U.S. PATENT DOCUMENTS

| | | | |
|---|---|---|---|
| 6,076,080 A * | 6/2000 | Morscheck et al. ......... 705/400 |
| 6,502,102 B1 * | 12/2002 | Haswell et al. ............. 707/102 |
| 6,563,522 B1 * | 5/2003 | Rosen et al. ................ 715/854 |
| 7,007,034 B1 * | 2/2006 | Hartman et al. ............ 707/102 |
| 7,076,494 B1 * | 7/2006 | Baer et al. .................. 707/102 |
| 2004/0189716 A1 * | 9/2004 | Paoli et al. ................. 345/853 |

FOREIGN PATENT DOCUMENTS

JP    2000-20295    1/2000

* cited by examiner

*Primary Examiner*—John E Breene
*Assistant Examiner*—Aleksandr Kerzhner
(74) *Attorney, Agent, or Firm*—Edwards Angell Palmer & Dodge LLP; Kongsik Kim

(57) ABSTRACT

A method for automating a software manufacturing process based on user interface form design designs a user interface form and then automates a manufacturing process to produce business program in a reverse order. This method includes generating a user interface form for business program including item name display section, data input section, and function-discernible event buttons, as graphic-user interface; allowing an interface form designer to designate DB name and table name; analyzing each interface form and automatically extracting field design information of table based on the item name and size of the data input section; generating ERD referring to the field design information and the table name, as graphic interface; automatically composing and executing SQL statement referring to the field structure to generate physical database; and automatically composing SQL statement executed in linkage with operation of the event button and linking the SQL statement to the event button.

10 Claims, 12 Drawing Sheets

METHOD FOR AUTOMATING SOFTWARE MANUFACTURING PROCESS BASED ON USER INTERFACE FORM DESIGN, AND COMPUTER READABLE MEDIUM RECORDING COMPUTER EXECUTABLE INSTRUCTION FOR PERFORMING THE SAME

BACKGROUND OF THE INVENTION

1. Field of the Invention

The present invention relates to a method for developing a computer program for business and its composing system (or, authoring tool), and more particularly to a software production automating method and its composing system based on process knowledge and user interface, which allow a user, not a programming expert but a person understanding actual business logic and flow, to develop a desired computer program in a rapid and efficient way.

2. Description of the Related Art

For development of a computer program, namely software, a standardized development methodology began after the nineteen seventies when the 'structured development methodology" based on Waterfall Model paradigm was systematically established.

This structured development methodology systemizes a stepwise implantation stage having a sequence of analysis-design-implementation-test-maintenance, and it allows complicated and difficult concept and procedures to be easily grasped and managed by using symbol-based design techniques and development tools specialized to every development stage. In addition, it was emphasized that a logical part and a physical part in software development should be separated and also a logical design should be ahead of a physical design. By separating the software development into two parts as mentioned above, a draft of logical system design is proposed to users for preliminary examination before the system is actually implemented.

Meanwhile, the structured development methodology systemizes the software development method, but it reaches a limit as software got complicated and users demanded a higher level after the nineteen eighties. In particular, the software development was in several unit module or small size system in the past, but the conventional structured development methodology could not cope with the changing environments since there was a demand for an information system from enterprises and also a large project considering strategic aspect of enterprises.

According to the above demands, C. Finkelstein proposed the term "Information Engineering" in 1981, and J. Martin materialized this conception into an information engineering methodology and widely propagated it. Here, the information engineering is defined as 'application of standardized methods required for planning, analysis, design and construction of an information system that is needed in enterprises or a part of the enterprise'.

The above information engineering development methodology has an enterprise-oriented aspect, so system data and automating procedures are modeled on the focus of information and work procedures of enterprises. In addition, flexible progress and integration among stages linked in the order of planning-analysis-design-construction were pursued, and it was intended to make the methodology and the case tool sufficiently complement each other. Thus, various common methodologies based on the information engineering introduce or develop by itself a case tool suitable for their own methodologies, so the methodology and the case tool are supplied together.

A common methodology based on the above information engineering development methodology basically follows the below procedure. That is to say, the methodology is composed of an analysis process for grasping user demands and schematizing them→a process of designing a database structure required for operating program on the basis of the model made in the analysis process→a process of designing a screen layout suitable for the user demands and the database structure→a process of executing an actual coding work to implement an execution program→a process of integrating partially-implemented programs and a system in an upward manner→a test process for testing detailed functions of each program and functions of an integrated program→an application process for moving a tested system to a real operation environment and conducting post maintenance.

The above information engineering development methodology is massively designed to be capable of supporting a large project for constructing an information system of an enterprise on the basis of logical organization of the structured development methodology, and also it has practicality by giving a case tool optimized for each stage. In addition, it was reinforced in the aspect of project management, so the information engineering development methodology cast anchor as a representative methodology in terms of software development and information system construction in 1980's and 1990's.

However, the feature of the information engineering development methodology that pursues systematic and thorough management requires too much time and cost. In addition, it is still based on the paradigm of the structured development methodology, so it has many problems in flexibility of system development. Thus, as alternatives, concepts of an object-oriented methodology and a CBD methodology appeared and have been vigorously studied, but it is not considered that such concepts are sufficiently practiced up to now.

Most of the information engineering methodology systems and their development systems currently used for development of computer program and software for business still have the following problems.

First, an existing software development methodology characterized in complex procedure and massive task has a low level of practicality and difficulty in development systemization.

That is to say, the existing development methodologies are composed of very complex procedures, and a massive output is required. In fact, in case of 'METHOD/1 (Client-Server Development Model ver. 9.5)' developed in Anderson Consulting, it is composed of 2 phases, 16 segments and 61 tasks in total, and enormous kinds of outputs are demanded. In addition, considering that an output prepared in a specific task is referred to and corrected in other tasks, it should be understood that a workload is more than that simply estimated using the number of outputs.

The existing development methodology is configured using complex procedures and enormous size due to the reason that it takes a method of constructing a system with considering data structure, process and user interface together from the initial analysis stage. However, in this method, the development method itself demands a developer to have solid sight and access method. In addition, the existing methodologies consider technical environments for constructing a system as well as a software region such as data and process. Under the above promise, though an actually excellent methodology appears to perfectly suggest a solid access method and clearly define output and guide required for each stage, it already becomes so complicated to lose its practical economical efficiency.

Second, there are structural inefficiency and unreality caused by considering the database structure most preferentially from the analysis and design process.

That is to say, the database-related portion is worst in flexibility during the software development procedure and most hardly corrected when any problem or an added item is generated. If any change occurs in the database structure, a lot of related modules are affected, causing serious increase of the number of processes. Thus, from a commonsense standpoint, it is natural that such an inflexible work is conducted in the latter part of the whole development processes.

However, in the existing development methodology, the database-related portion is positioned in a relatively front position in view of the whole development processes, and essential functions executed by software is basically premised to be focused on data process, not on automation of business and work functions. Thus, the data modeling work is conducted together with process analysis from the early stage of the methodology and even the design stage is conducted on the focus of final specifications and design of a database structure up to a physical dimension. That is to say, data structure is already settled before beginning a regular implementation work such as program source coding.

The above method has been considered to be too fair up to now, but this method in fact has two serious structural problems.

First, considering a data structure from the analysis process becomes a significant limit in fundamentally improving and innovating business processes. When the information engineering firstly appeared, the development of information system was essentially directed to analyzing events occurring at work sites and correcting inefficient parts so as to replace human works with information technology. Thus, there was needed to transfer current processes and data structure to developers so that the developers might easily understand them, and various modeling techniques were for such works. In the past, the principle object of the development methodology was to model the actual as it was, but these days, innovating a current system, organization or process is an essential issue.

That is to say, in order to drive true process innovation and BPR, the most important demand of users is to research and develop more reasonable process by utilizing an innovative means, namely IT, beyond the business procedure and habitual practices of the existing systems or work places. In this point of view, it would be considered as an almost impossible precondition in accomplishing a fundamental object to evaluate efficiency and possibility of improvement of business processes together with considering a data structure corresponding to a current structure from the designing stage.

The method that considers a data structure from a too front stage has another structural problem that significant time and endeavor are required for changing a database structure once settled, and accordingly too much endeavor is required for test and verification from the design stage. As mentioned above, the parts related to a data structure are lack of flexibility, so it is difficult to correct them if they are once settled. Thus, in order to make one simple correction for the database structure due to any problem or requirement occurring in a process or data structure after conducting an actual implementation stage, there arises a problem that screen and output structures of the corresponding module and its source code should be all corrected, and also preceding or succeeding modules operating in relation to the above module and other modules making superior or subordinate functions should be all corrected. Since even a simple correction is very difficult, much cost and endeavor are required for reliable test and verification when each stage is progressed. In spite of that, an application software reflecting a complex industrial work place cannot help undergoing such trial and error.

Third, since roles of business process designer and professional developer are clearly classified, there are needed much time and cost for communication between them, it is not easy to reflect knowledge of the business process expert on the software.

That is to say, in the existing development methodology, a role of a developer having a computer technique is clearly separated from a role of users who understand work logic. It is a natural result since developer and user have different knowledge and different point of views on system.

In the aspect of knowledge, the developer does not exactly know the business logic, and the user does not have development capability or knowledge for constructing a system. In addition, in the aspect of system, two subjects have great difference. In the development of software, a user has a standpoint 'what' the system will give, but a developer has a standpoint 'how' the system is implemented.

Thus, developers should confer with users or related professionals sufficiently about what for and how to make a program, and thus so complex examination, confirmation and test procedures are inevitably included in the process of analysis-design-development.

Due to such features, communication is an essential factor in the analysis-design stages, and communication is most lively made in those stages. In fact, communication between developers and users is considered to be very important in the software development project but not easily conducted in a successful way.

In addition, since two independent subjects take two essential work parts in software development, namely understanding for business process and development technique, many problems are caused in following stages. Thus, the software development is essentially a very difficult work, and the development methodology becomes complicated.

In order to narrow the gap between developers and users and enhance efficiency of communication, various tools and techniques have been researched and developed. Tools for supporting analysis and modeling such as DFD (Data Flow Diagram), ERD (Entity Relationship Diagram) and UML (United Modeling Language) make complex phenomenon be abstracted for better understanding, and also help to minimize discord of communication between developers and users.

In addition, it is also one of useful methods that a prototype is used for looking into requirements of users and allowing developers to understand the requirements. However, the prototype experiences many changes while it is made into a finished product, and it may awkwardly arise many misunderstanding to users about a finished product, and interchange or integration with other program or system is not easily obtained.

As a result, in view of a user who will use software, it will be most ideal that a business process designer who essentially understands business process conducts all processes from design to concrete implementation. However, in the existing development method and system, even detailed functions for controlling hardware and operating system should be developed as source codes. In addition, in the component-based development methodology designed for maximizing software development productivity through reusability, the works for combining each component and linking it to user interface should be conducted by expert developers. Thus, it has been substantially impossible to expand a role of a business process designer as mentioned above.

SUMMARY OF THE INVENTION

The present invention is designed to solve the problems of the prior art, and therefore it is an object of the present invention to solve the problems of deteriorated productivity, serious trial and error and much time and cost consumption, communication error between designers and developers, caused by executing an abstract design work such as database structure prior to designing a specific interface form (or, input/output documents), by automating many works for actually implementing program and database after essential parts conducted by persons are mostly designed in an initial stage.

In particular, an object of the present invention is to develop a user-oriented high-functional software that is innovatively faster than a conventional methodology or system, by developing a composing system (or, an authoring tool) supporting for expanding roles of persons having understanding capability for business process, which are considered as an essential competitive power in producing a business software, to the maximum and also automating each stage of the developing process using artificial intelligence.

In order to accomplish the above object, the present invention provides a method for automating a software manufacturing process based on graphic-user interface design, which firstly designs a user interface screen and then automates a manufacturing process so as to produce a business program in a reverse order, the method including (a) generating a user interface form for a business program, which includes an item name display section for displaying an item name of data to be input by a user, a data input section for inputting data corresponding to the item name, and function-discernible event buttons, as a graphic-user interface; (b) allowing a designer of each interface form to designate a database name and a table name, in which the data input through the interface form is to be stored; (c) analyzing each interface form and automatically extracting field design information of a database table on the basis of the item name in the item name display section and a size of the data input section; (d) automatically generating an ERD (Entity Relationship Diagram) defining a field structure of each table with reference to the field design information analyzed from each interface form and the table name designated for each interface form, as a graphic interface; (e) automatically composing and executing a SQL (Structured Query Language) statement for generating a database with reference to the field structure of a table displayed in the ERD so as to generate a physical database; and (f) automatically composing a SQL statement to be executed in linkage with an operation of the event button by means of discernment of the event button, and making the SQL statement be linked with an operation of the event button.

Preferably, the step (c) includes (c1) allowing the designer to designate a search direction and a search range of the item name display section on the basis of the data input section included in each interface form; (c2) automatically extracting an item name written in the item name display section for each data input section by means of the designated search condition; (c3) designating the extracted item name as a field name or processing the extracted item name on the basis of a predetermined standard to be designated as a field name; (c4) calculating a size of the data input section to designate the size as a length of the field; and (c5) linking the data input section to the designated field name. Here, the step (c3) may be conducted in such a way that blank and special character are removed from the extracted item name so as to process the extracted item name.

Preferably, in the step (c4), kind and size of a current font are recognized for each data input section to calculate the number of letters capable of being input to the data input section, and then the number of letters is designated as the length of the field.

In the step (b), it is preferred that a predetermined character string in the interface form selected by the designer is designated as a table name. At this time, the predetermined character string may be a title of the interface form.

Preferably, each interface form and ERD are synchronized with each other. In this case, if the designer makes addition, deletion or change in the item name display section and/or the data input section included in the interface form, the changed matter may be automatically reflected on the ERD. Furthermore, if the designer adds or deletes a field of a specific table included in the ERD or changing name and/or attribute of a field by the designer, the above change may be automatically reflected in a form of addition, deletion or change of the item name display section and/or the data input section on the interface form related to the specific table.

In the present invention, the function of the event button may be one selected from the group consisting of data storing, data deletion, movement to forward record and movement to backward record, or their mixtures.

The method for automating a software manufacturing process according to the present invention as mentioned above may be recorded in a computer-readable recording medium. This recording medium may be ROM (Read Only Memory), RAM (Random Access Memory), CD (Compact Disk) ROM, DVD (Digital Video Disk) ROM, magnetic tape, floppy disk, optical data storage and so on. In addition, this recording medium may be distributed in a computer system connected through a network so that computer-readable codes may be stored and executed in a distribution way.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
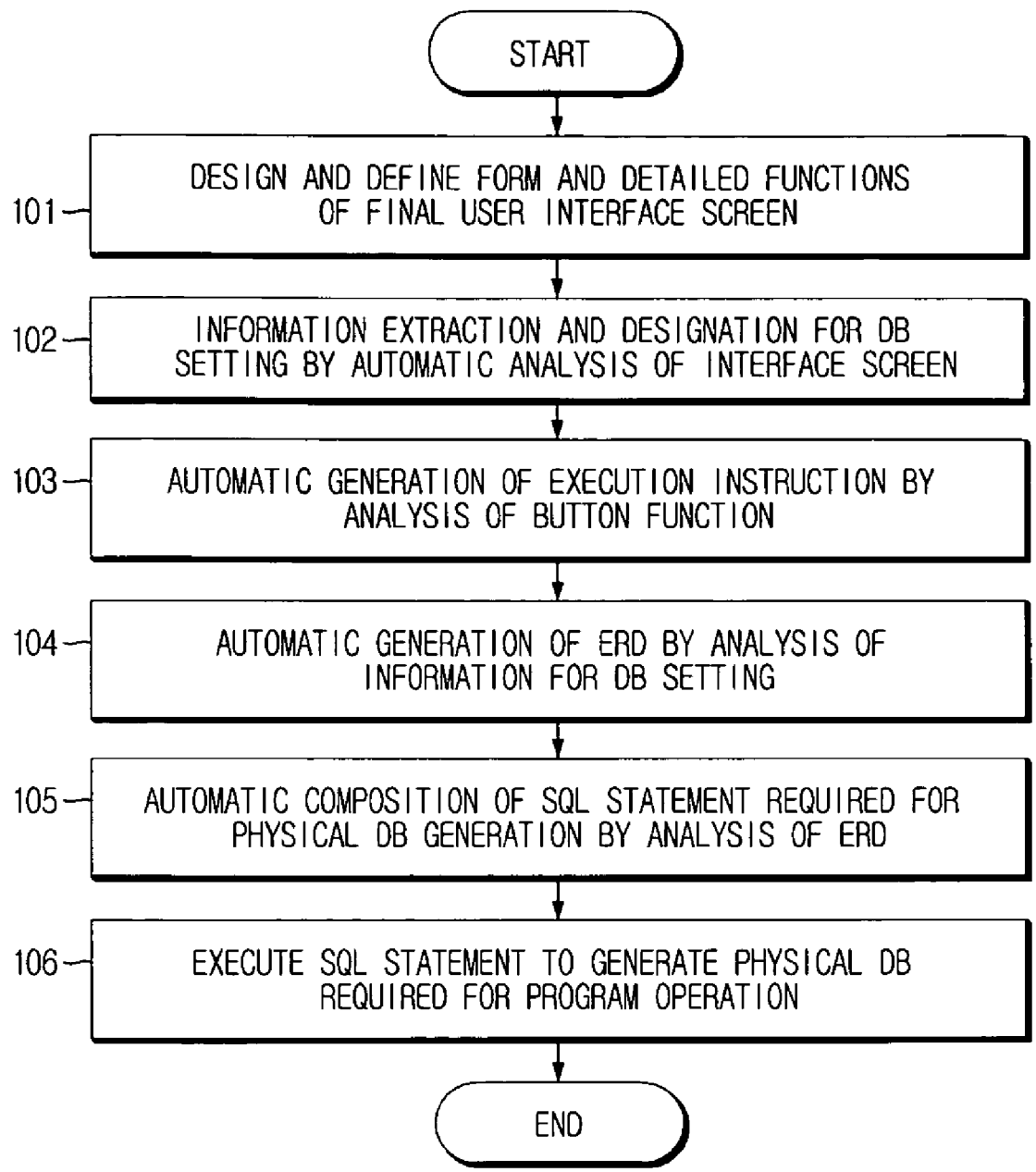
FIG. 1 is a flowchart illustrating a software production automating method according to the present invention.

FIG. 1 is a flowchart schematically illustrating 'a software production automating method' according to an embodiment of the present invention.

As shown in FIG. 1, the software production automating method proposed in the present invention is generally composed of 6 steps 101 to 106.

Specifically, in the step 101 of designing and defining form and detailed functions of a final interface form, design elements (see FIG. 2) for composing an input/output screen to be used by actual end users are generated mainly using a GUI development and composing tool that may be easily used by users lack of professional software technique such as coding (e.g., a process analyzer, a worker acquainted with business logic, etc.), and specific application functions are designed and defined for implementing processes and detailed processing functions that will be executed in the corresponding screen.

In the step 102 of information extraction and designation for DB setting by automatic analysis of the interface form (or, input/output documents), names related to input sections in which the end users should actually input data on the interface form designed and generated in the former step 101 are automatically searched so as to automatically extract a database field name connected to the input sections composing the interface form, then blank or special character is removed from the database field name so that the database field name is suitable for use, and then it is designated as a database field name for storing information in the data input sections. In addition, in this step, a database table name connected to the input sections is also automatically designated in a bundle by utilizing an automatic table name designating program (see FIG. 7).

After the table name and the field name to be connected to the data input sections composing an interface form (or, input/output documents) are designated, function buttons for 'store', 'delete', 'move to a forward record', 'move to a rearward record' and so on are generated, and then an execution instruction code (e.g., SQL (Structured Query Language)) for acting a corresponding function is automatically generated by the composing system provided in the present invention. This process is corresponding to the step 103 of automatically generating an execution instruction code by analysis of a button function (see FIG. 12).

After the interface form is designed, DB structure design information (e.g., a table name, a field name, a data type, a data length, and a connection field (or, Join information)) designated to each data input section are analyzed to generate an ERD (Entity Relationship Diagram). This process is corresponding to the step 104 of automatically generating ERD by analysis of the information for DB design (see FIG. 9).

If ERD is made, tables and fields generation SQL for generating a physical database structure suitable for the corresponding ERD should be composed. In addition, the SQL is automatically generated by the composing system of the present invention in the step 105 of automatically composing SQL required for physical DB generation by analysis of ERD (see FIG. 10).

Finally, in the step 106 of executing SQL to generate a physical DB required for program operation, the physical DB generation SQL automatically made in the step 105 is executed to generate a physical database structure to be actually utilized.

If the above procedure is proceeded, after persons understanding business logic but lack of knowledge or technique about an existing programming language design only an interface form for end users, a complete application program including even generation of a physical database may be very rapidly developed by utilizing the methodology of the present invention and other detailed support composing systems (or, authoring tools), and it may be applied to the practice as it is.

Figure 2:
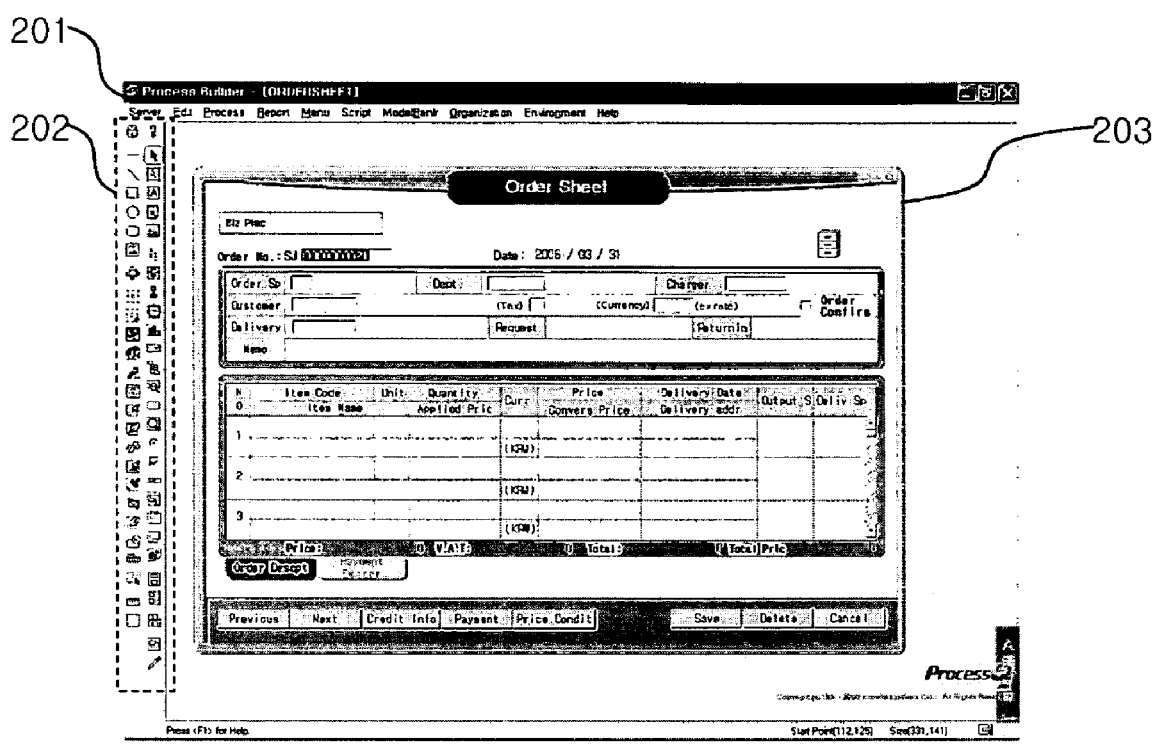
FIG. 2 shows a GUI (Graphic-User Interface) composing system (or, an authoring tool) for the interface form design of the software production automating method according to one embodiment of the present invention.

FIG. 2 shows an example of a screen for a composing system (or, an authoring tool) according to this embodiment, which supports each detailed step of the software production automating method described in FIG. 1.

Reference numeral 201 denotes a main frame of the composing system provided in the present invention, and reference numeral 203 denotes an example of an interface form under development in the composing system. The interface form like the reference numeral 203 is designed and implemented using business components 202 provided by standard object modeling of element functions required for development of a business program.

Figure 3:
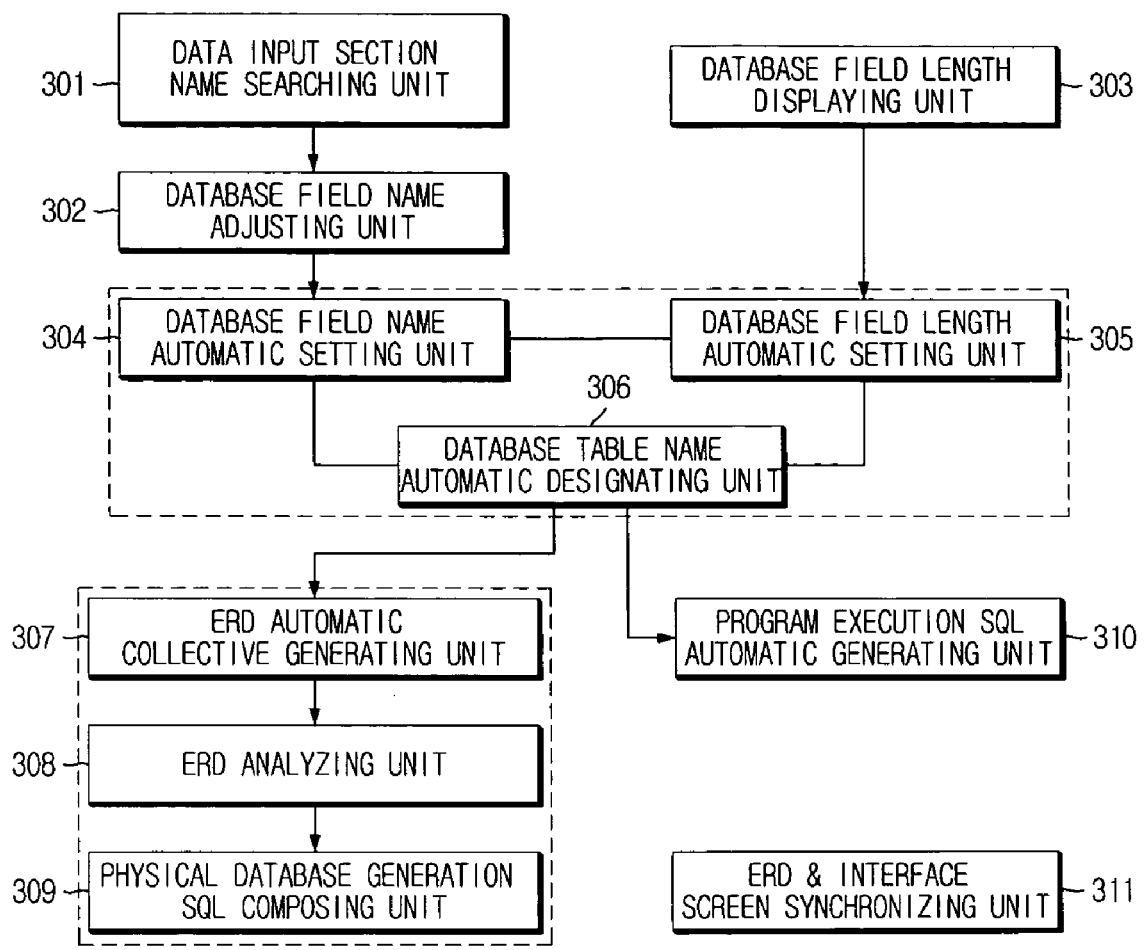
FIG. 3 shows a configuration of a composing system (or, an authoring tool) for supporting software production automation according to the present invention.

FIG. 3 shows main functional configurations of the composing system (or, the authoring tool) provided in the present invention in order to support each detailed step of the software production automating method described with reference to FIG. 1, and their correlations. The detailed components of FIG. 3 will be additionally described later with reference to another drawing or a part of another drawing, and general functions and relation to the production method described in FIG. 1 will be described here.

When an interface form of a business program is designed, an item name display section for displaying information to be included in a data input section is generated in a left or upper side position of the corresponding data input section, and this item name is frequently used as a field name of the database.

A data input section name searching unit 301 automatically searches a left or upper position of each data input section if an interface form is designed, and then checks whether an item name of the corresponding data input section exists. If the item name exists, a database field name adjusting unit 302 removes a blank or special character so that the corresponding item name may be used as a field name of the database, and then transmits it to a database field name automatic setting unit 304.

Figure 6:
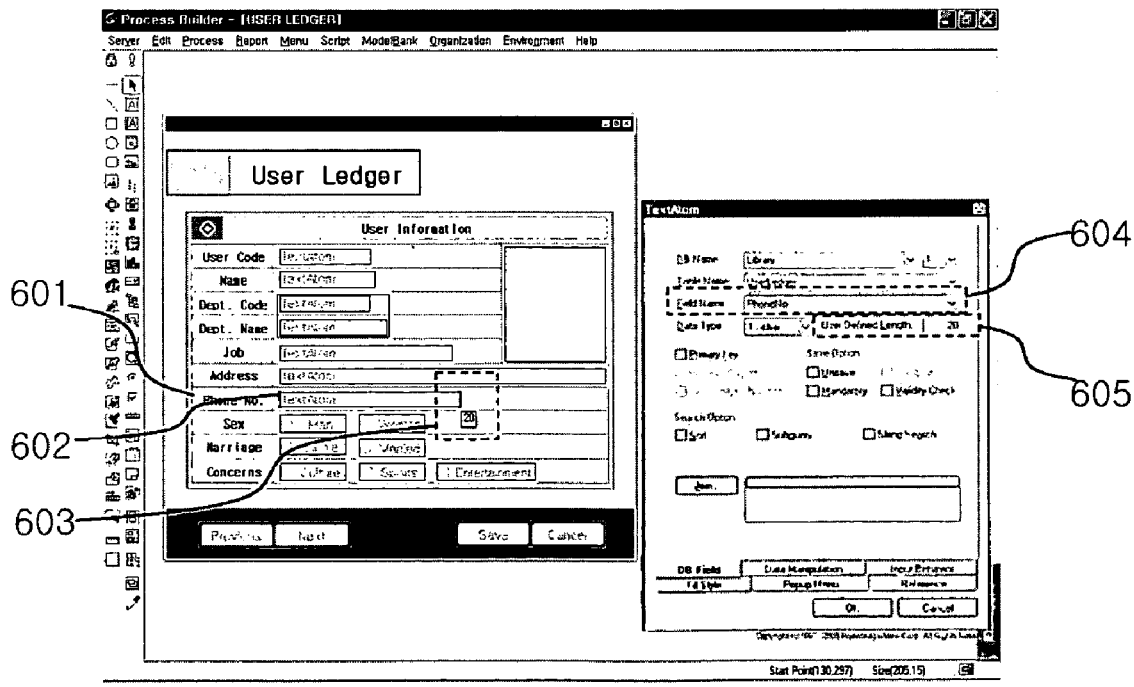
FIG. 6 shows a program for automatically setting field name and field length in the data input section according to one embodiment of the present invention.

If a length of a data input section is adjusted by dragging a mouse when the data input section is generated during designing of an interface form, a database field length displaying unit 303 automatically calculates the number of letters that may be put into the corresponding input section and then displays it as a small tool tip on the screen (see 603 of FIG. 6). In addition, the database field length displaying unit 303 automatically recognizes a length of the data input section at the instant that a button of the mouse dragged by a user is released, and then transmits it to a database field length automatic setting unit 305.

Meanwhile, when an interface form is designed, a title of the corresponding screen is generally used as a common table name of data input sections of the corresponding interface form. In this point of view, a database table name collective designating unit 306 sets an item name display section for collective designation of a table name of the data input sections of the interface form, and then collectively designates a corresponding item name (e.g., a title of the interface form) as a table name of all data input sections.

If the table name, the field name and the field length connected to each data input section are designated, a program execution SQL automatic generating unit 310 analyzes corresponding information and then automatically generates SQL used in execution of program according to kinds of function event buttons used in the interface form.

An ERD automatic collective generating unit 307 automatically generates ERD by analyzing the already designated DB setting information (e.g., a table name, a field name, a data type, a data length, a connection field (Join information), and so on). In addition, an ERD analyzing unit 308 analyzes this ERD information, and a physical database generation SQL composing unit 309 automatically generates SQL for DB generation.

Even after the interface form is designed and the database is completely generated, any change may occur in ERD. At this time, in order to eliminate any troublesomeness for conducting both of ERD correction and interface form correction and also keep them always in a synchronized state, an ERD and interface form synchronizing unit 311 automatically changes the data input section DB setting information of the interface form according to the change of ERD information.

Figure 4:
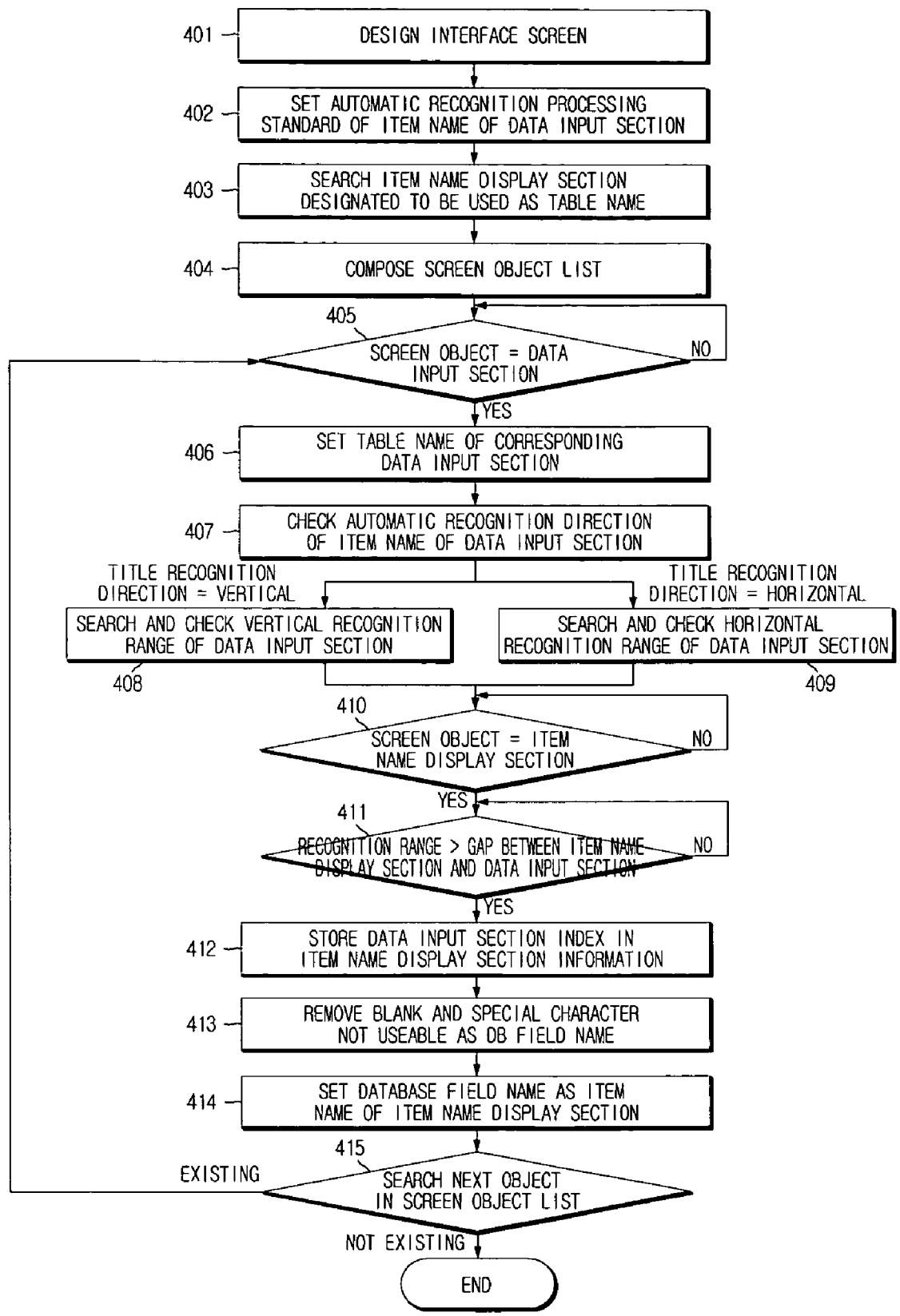
FIG. 4 is a flowchart illustrating a program for automatically searching and setting table name and field name in a data input section according to one embodiment of the present invention.

FIG. 4 is a logic flowchart illustrating a programming unit that searches an item name display section to automatically set a table name and a field name in the data input sections that compose the interface form.

First, a designer designs an interface form (step 401), and then selects an object to be used as a table name of the data input section of the corresponding form from the item name display sections that compose the interface form. In addition, an automatic recognition processing standard is set so as to determine in which direction a title of the data input section is automatically searched and in which range (e.g., in a horizontal recognition range or in a vertical recognition range) a title will be recognized 402.

After the designer proceeds his/her work to this point and then stores the corresponding interface form, the program for automatically searching and setting a table name and a field name in a data input section searches an item name display section designated in the data input sections of the corresponding interface form by the designer to be used as a common table name (step 403), and then a list for all components of the interface form is composed (step 404). After that, with repeating the procedure from the step 405 to the step 415, a table name and a field name of each data input section are designated.

Specifically, it is checked whether objects composing the interface form are data input sections (step 405). In case they are data input sections, an item name of the item name display section set to be used as a table name before by the designer is set as a table name 406. In addition, the automatic recognition direction set in the step 402 is checked (step 407). In case the recognition direction is vertical, an item name of the data input section is searched and checked using the vertical recognition range (step 408), while, in case the recognition direction is horizontal, an item name of the data input section is searched and checked using the horizontal recognition range (step 409). In addition, with searching the item name display sections in the screen object list one by one (step 410), it is checked whether the corresponding item name display section is conforming to the conditions of the automatic recognition direction and the recognition range, already set (step 411). If it conforms to the conditions, an index of the data input section is stored in the corresponding item name display section to connect the item name display section with the data input section (step 412). In addition, a blank and a special character unusable as a field name of an actual database are removed from the item name of the item name display section (step 413), and then it is set as a field name of the data input section connected in the step 412 (step 414).

If the procedure from the step 405 to the step 414 is executed for one data input section, a next object is searched in the screen object list composed in the step 404 (step 415), and, if the next object exists, the procedure is repeated from the step 405 for checking whether it is a data input section, while, if it does not exist, the program is ended.

Figure 5:
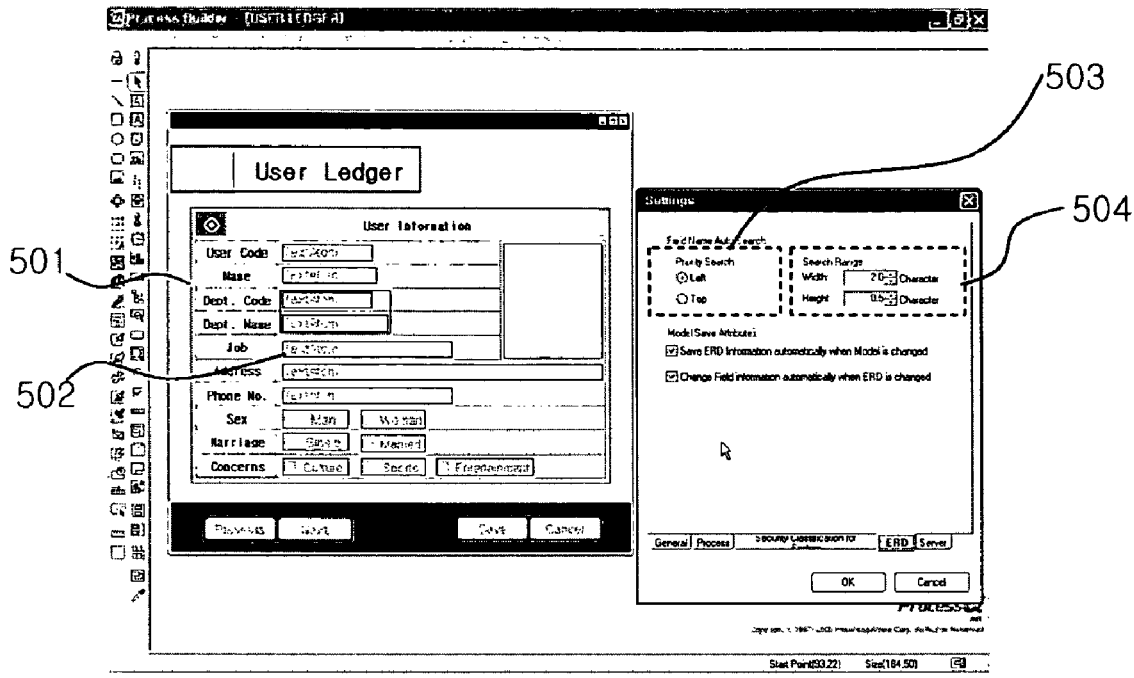
FIG. 5 shows a program for automatically searching table name and field name in the data input section according to one embodiment of the present invention.

FIG. 5 shows an example of a program for automatically searching a table name and a field name of a data input section.

As shown in FIG. 5, in most cases, an item name display section 501 and a corresponding data input section 502 are existing in pairs in a general data input screen. In FIG. 5, text is written in the item name display section, and a rectangular box is input in the data input section. If a designer sets a title recognition direction 503 of the data input section and a horizontal and vertical recognition range 504 in the program screen of FIG. 5, they are utilized as basic information for automatically searching a table name and a field name in the steps 407, 408 and 409 of FIG. 4.

FIG. 6 shows an example of a program for automatically setting a field name and a field length of a data input section.

As shown in FIG. 6, in a data input section 602, an item name of an item name display section 601 is designated as a field name 604. In addition, if a mouse is dragged for actually generating the database input section 602, its length is recognized and then the number of letters capable of being input to the corresponding length in consideration of kind and size of a selected font is automatically displayed on the composing system screen in real time (see 603). In addition, if the designer releases a mouse button at a specific length, the number of letters shown in the screen at that instant is automatically set as a field length of the corresponding data input section 605.

Figure 7:
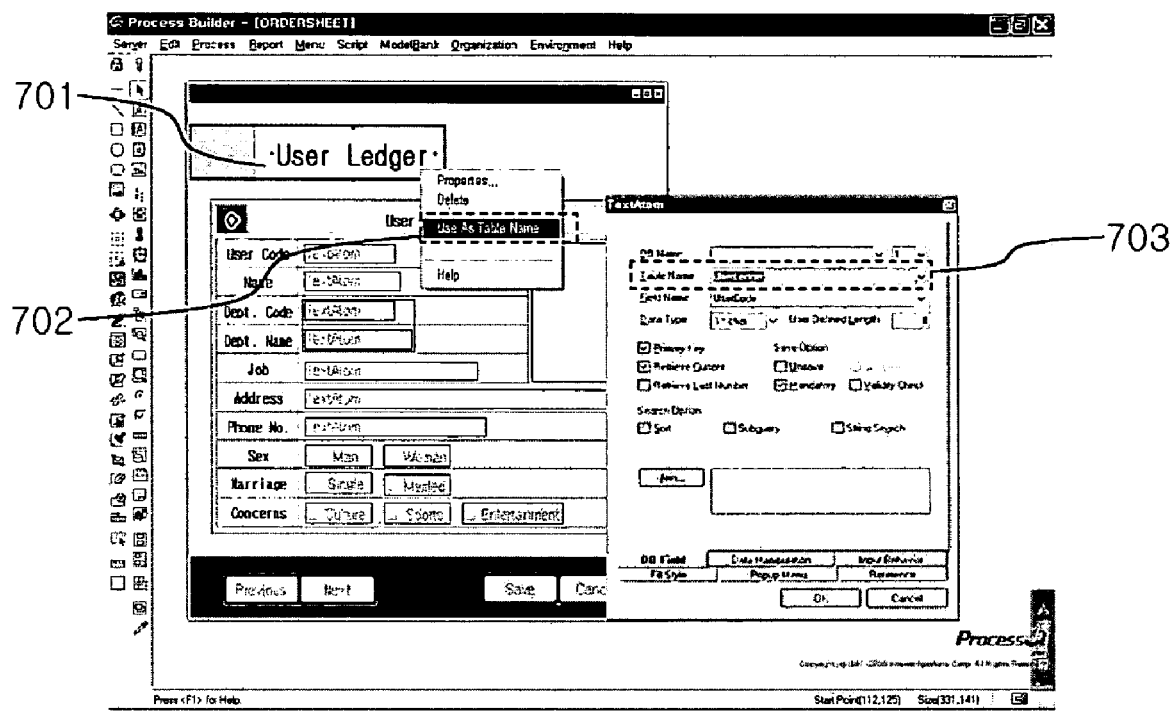
FIG. 7 shows a program for collectively designating table names in the data input section according to one embodiment of the present invention.

FIG. 7 shows an example of a program for selecting a title display section to be used as a table name of a data input section and collectively designating a title of the corresponding title display section as a table name of all data input sections existing in the corresponding interface form.

As shown in FIG. 7, if clicking a right button of a mouse in a title 701 of the interface form to set the corresponding title display section to be used as a table name 702, table names of all data input sections in the corresponding interface form are collectively designated with a title of the title display section 701.

Figure 8:
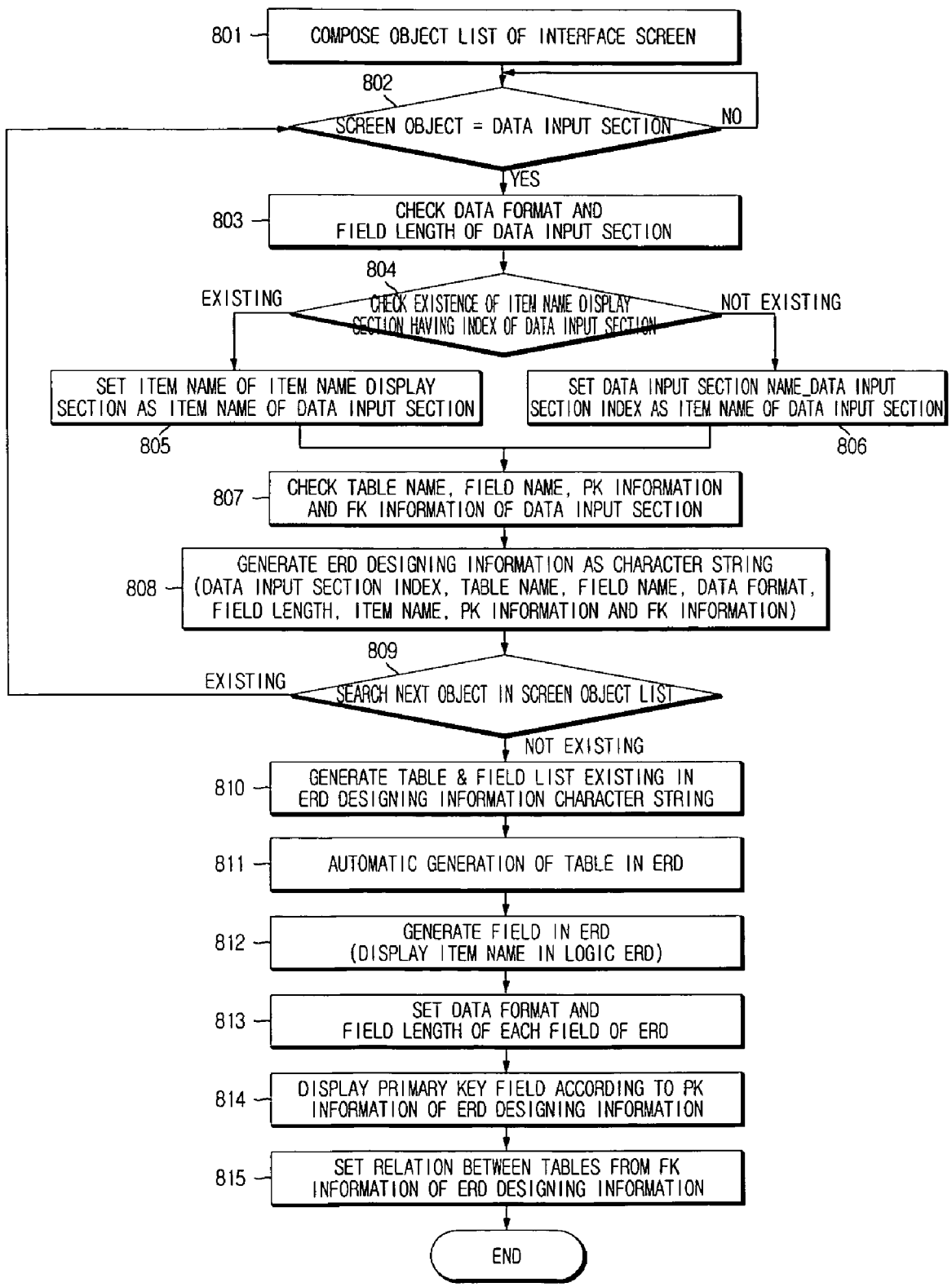
FIG. 8 shows a configuration of a program for automatically designing an ERD (Entity Relationship diagram) according to the present invention.

FIG. 8 is a flowchart illustrating a processing procedure in the ERD automatic designing program.

Referring to FIG. 8, if a user selects a specific interface form already designed and then operates the ERD automatic designing function, the ERD automatic designing program composes a list of objects that compose the interface form (step 801). In addition, while the screen objects are checked one by one with reference to this list, if any object is a data input section (step 802), various database setting information of the corresponding data input section is checked to compose a data combination in a text string format.

If the object is checked as a data input section, a data type and a field length are checked (step 803). And then, an item name to be used in a logic ERD model is checked (here, the item name should be distinguished from a field name in a physical DB model) (step 803). At this time, in case a specific item name display section in the step 412 of FIG. 4 has an index connected to the data input section (step 804), an item name of the item name display section is set as an item name of the data input section (step 805). In addition, in case there is no item name display section connected to the corresponding data input section, an item name is set in a form of 'data input section name_data input section index' by combining a peculiar name of the data input section designated by a user and an index of the data input section (step 806).

After an item name for logical model is set, a table name and a field name that are DB setting information of the data input section are checked, and it is also checked whether the corresponding data input section is designated as a primary key or a foreign key referring to a specific field of another table (step 807).

Finally, the setting information for ERD generation (e.g., a data input section index, a table name, a field name, a data type, a field length, an item name, PK information and FK information) collected through the steps 803 to the step 807 for the data input section that composes the interface form is composed into a text string format peculiar to the data input sections (step 808), and then the work for extracting ERD designing information from the data input section of the interface form is completed. If the information extracting work is completed for one data input section, a next object is searched from the object list composed in the step 801 (step 809), and then, if the next object is a data input section, the procedure from the step 803 to the step 808 is repeated. That is to say, the above procedure is conducted for all data input sections that compose the interface form.

The ERD automatic designing program associates the ERD designing information prepared as above and composes a list of tables and fields existing in a designing information character string into a tree form (step 810). A table required on ERD is automatically generated based on the above (step 811), and then the field name and item name information is read from the ERD designing information to display a field name in a physical ERD model and also display the item name set in the step 805 or the step 806 in a logic ERD model (step 812).

If the generation of table and field is completed, the table and the field are applied on ERD according to a data format and a field length designated to each field (step 813), and a field designated as a primary key (PK) is moved to a top of the table and indicated separately so as to show it is a primary key field (step 814). Finally, related tables are connected according to the PK information of the ERD designing information (step 815), thereby completing the ERD automatic designing.

Figure 9:
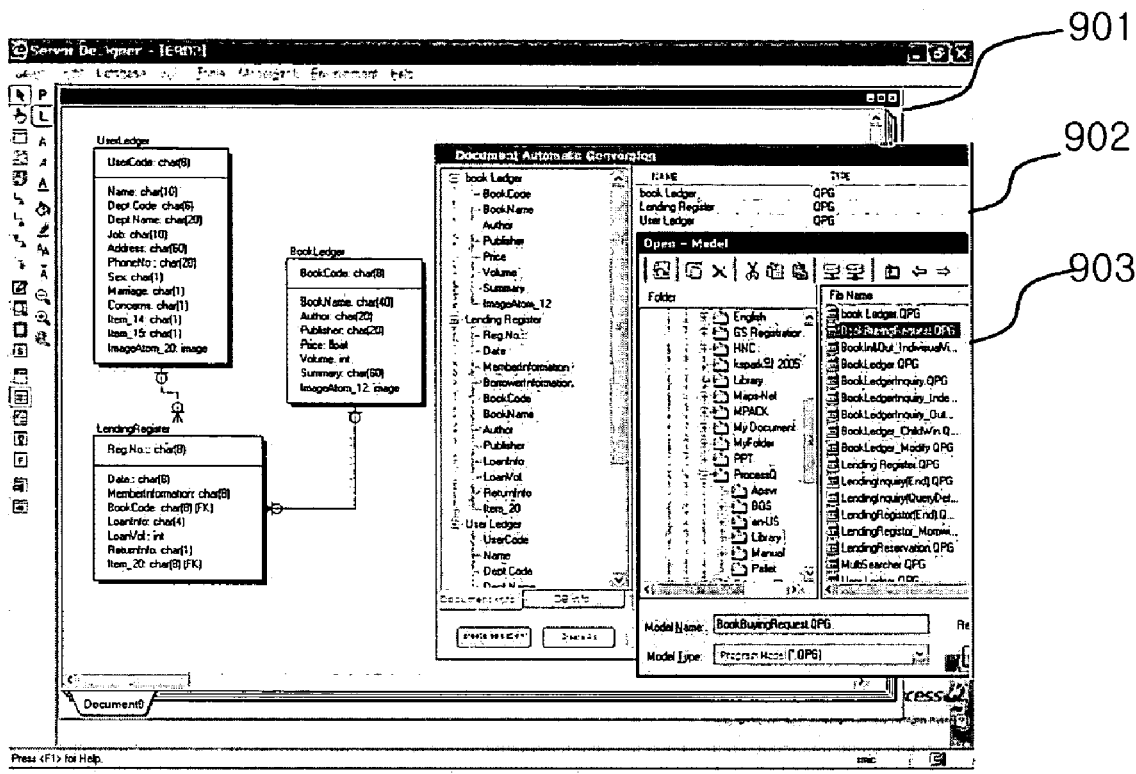
FIG. 9 shows an automatically generated DB information display section and an ERD display section of the ERD automatic design program according to one embodiment of the present invention.

FIG. 9 shows an example of an ERD automatic designing program.

As shown in FIG. 9, the ERD automatic designing program selects an interface form used for generating ERD with seeing the list 903 on the file dialogue. Then, the ERD automatic designing program automatically analyzes the ERD designing information read from the corresponding interface form to configure a required table and field list into a tree shape, and then shows it on the screen 902. In addition, if a user provides an ERD automatic designing instruction, an automatically designed ERD is drawn on an ERD displaying unit like 901.

Figure 10:
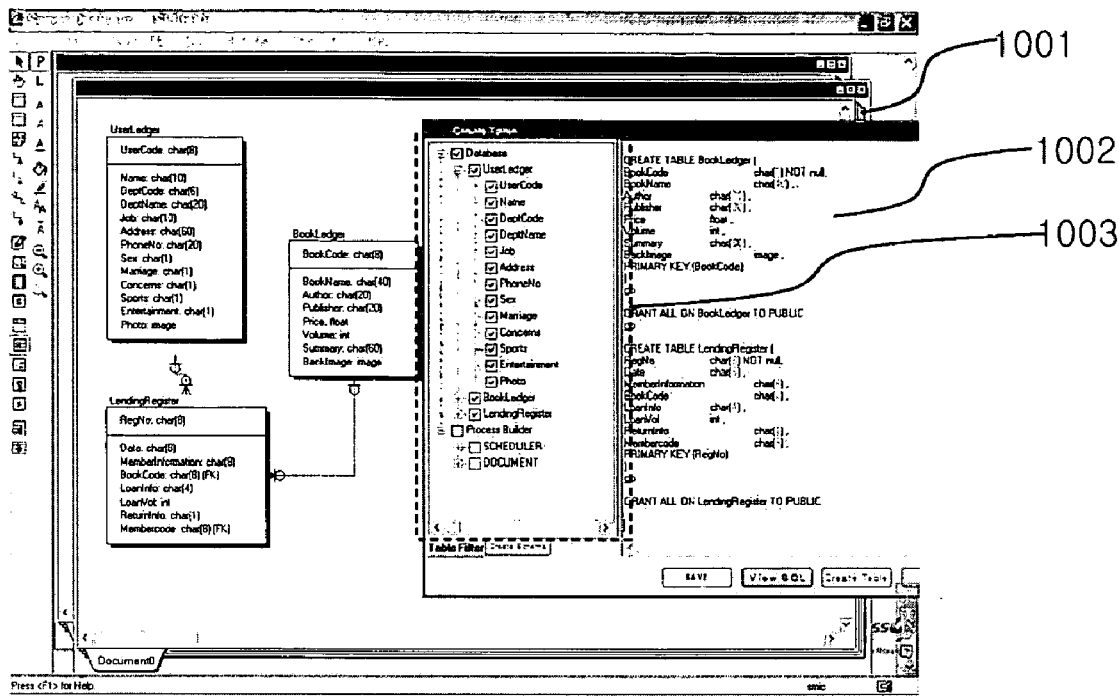
FIG. 10 shows a program for automatically composing and executing a SQL (Structured Query Language) for generation of a table according to one embodiment of the present invention.
Figure 10:
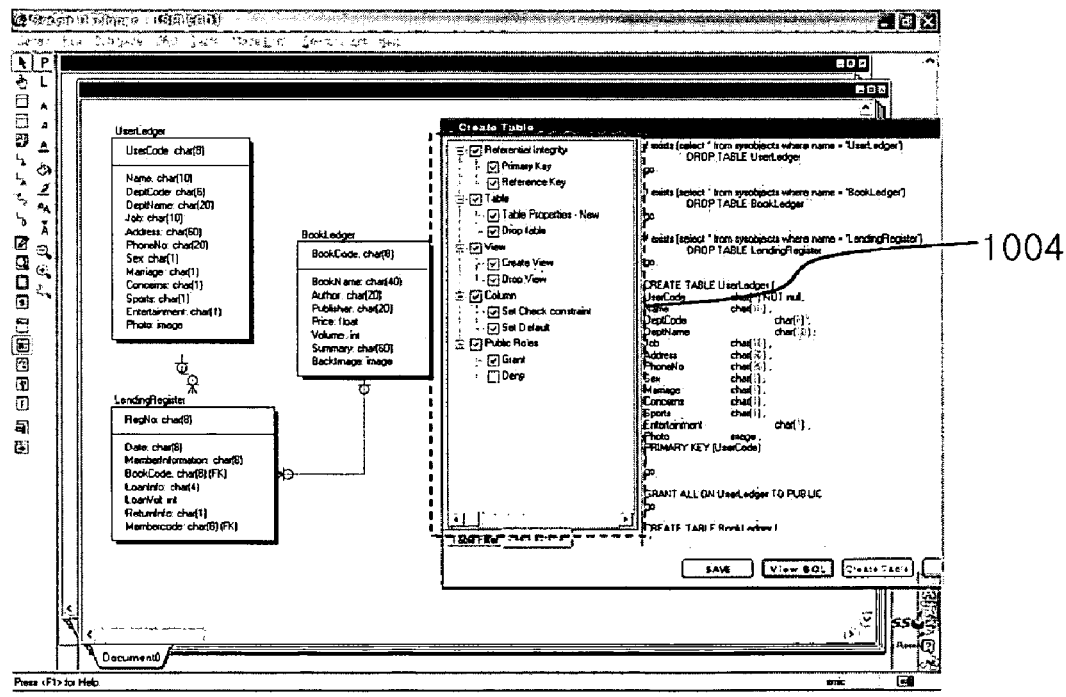

FIG. 10 shows an example of a program for automatically composing and executing SQL for table generation.

After a user automatically generates ERD 1001 using the ERD automatic designing program as shown in FIG. 10 or directly designs ERD from the first and then gives a physical table generating instruction suitable for the corresponding ERD, the SQL automatic composing program for table generation automatically generates a SQL statement 1002 required for physical table generation. At this time, the user may freely select whether or not to generate table and field and select various options 1004 in a detailed option setting window 1003 so that a SQL statement is newly edited and generated.

Here, the options capable of being set here may include whether or not to designate a primary key, whether or not to generate a table, whether or not to delete an existing table in case a table with the same name exists, whether or not to delete an existing view table when a view table with the same name exists, whether or not to set effectiveness of each column and default value, whether to grant or deny public right.

After the SQL statement for table generation is automatically composed, once a user gives a table generation instruction, the corresponding SQL statement is instantly executed to generate the corresponding table and field in the physical database.

Figure 11:
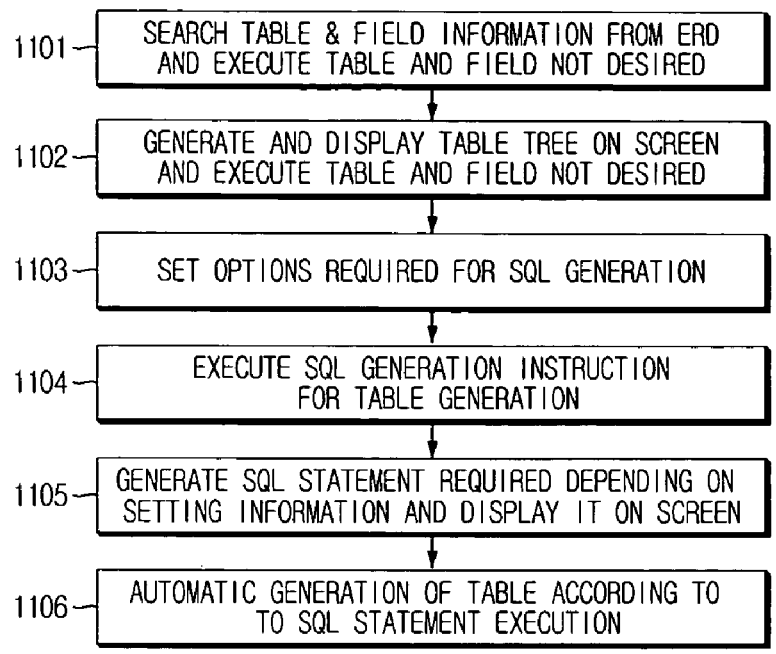
FIG. 11 is a flowchart illustrating the SQL automatic composing and executing program according to the present invention.

FIG. 11 shows a procedure of the program for automatically composing and executing SQL for table generation already described in FIG. 10.

Referring to FIG. 11, the table and field information is searched from ERD 1001 (step 1101, see FIG. 10). And then, table and field to be generated are composed in a tree shape and shown on the screen, and table and field not desired by the user may be excluded (step 1102). If the table and field to be generated are confirmed, the user may set various options required for SQL statement generation (step 1103).

If various information required for automatic composing of SQL statement for table generation is confirmed, the user gives an instruction to generate a SQL statement for table generation (step 1104). Then, the program colligates and analyzes the previously set information and displays generated SQL statements on the screen 1002 (step 1105, see FIG. 10). If the user finally gives a SQL statement executing instruction, the corresponding SQL statement is executed to automatically generate a table in the physical database (step 1106).

Figure 12:
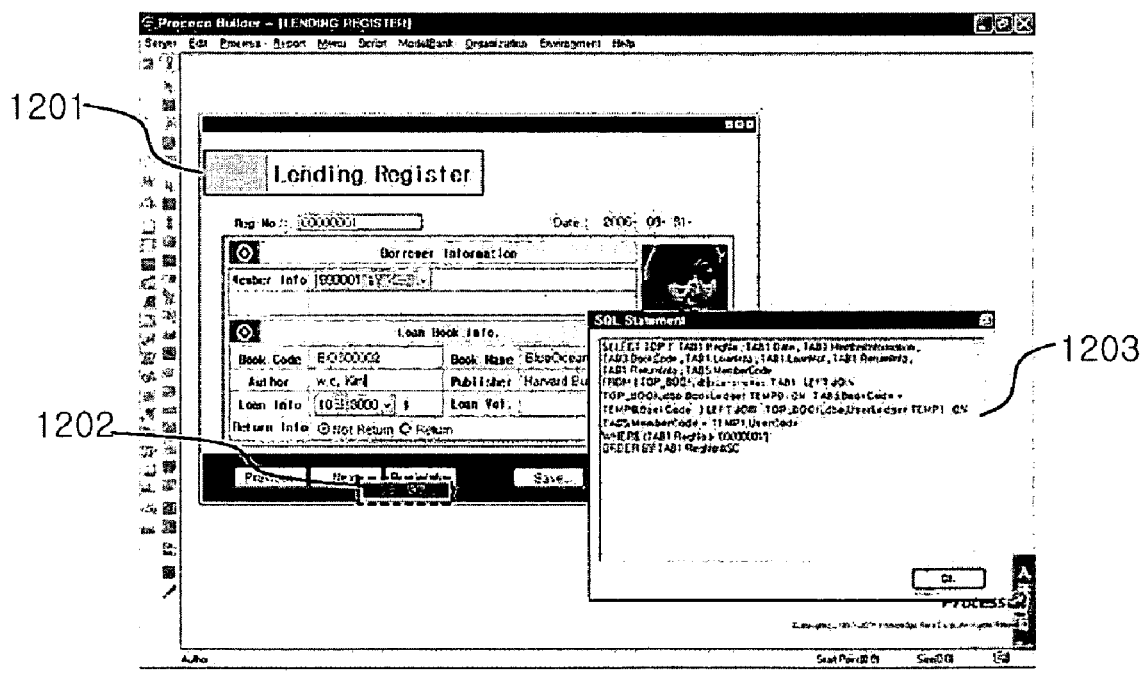
FIG. 12 shows a system for automatically generating a SQL required for DB operation after analysis of an interface form according to one embodiment of the present invention.

FIG. 12 shows an example of a program for automatically generating a SQL statement required for DB operation after analyzing an interface form. It should be understood that this program is operated in the step 103 of automatically generating an execution instruction code by analysis of a button function shown in FIG. 1, and is corresponding to the program execution SQL automatic generating unit 310 shown in FIG. 3.

Referring to FIG. 12, an interface form designer should firstly design a specific interface form 1201, and then generate a function button that causes DB operation in the screen. In FIG. 12, the function button includes a 'forward' button, a 'backward' button, 'a front page' button, a 'rear page' button, a 'book information' button and a 'correction' button. If clicking a right button of the mouse on a specific function button after generation of required buttons 1202, it is possible to see contents of a SQL statement 1203 automatically generated and executed when the corresponding function button is clicked.

Figure 13:
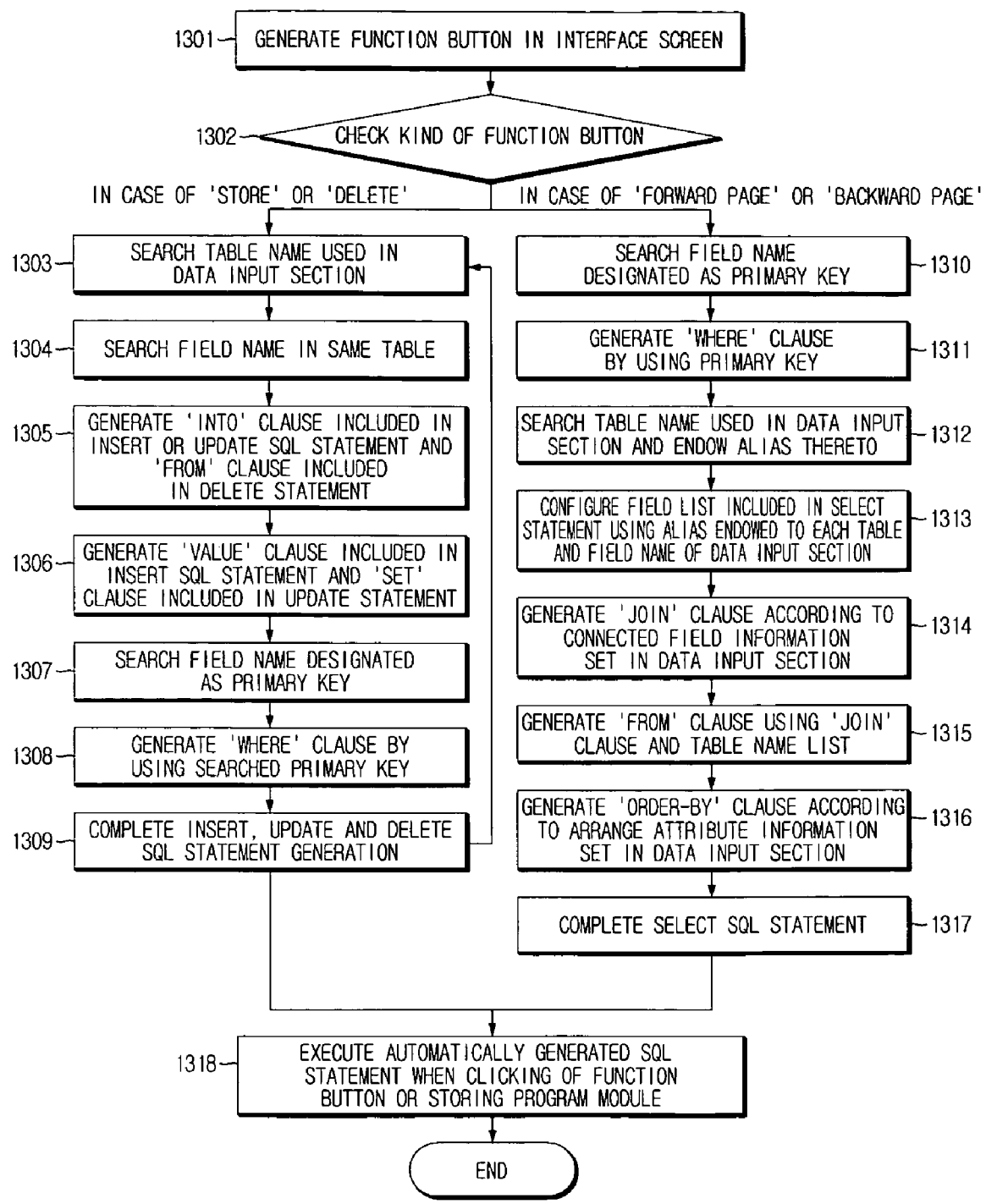
FIG. 13 shows a configuration of the system for automatically generating a SQL required for DB operation after analysis of an interface form according to the present invention.

FIG. 13 shows a progressing procedure of the program for automatically generating a SQL statement required for DB operation after analysis of an interface form described in FIG. 12.

Referring to FIG. 13, if the user generates a function button in the interface form and then defines its kind (step 1301), the program automatically generates a SQL statement that will be operated when the user clicks the function button.

Specifically, the program firstly checks the kind of the function button (step 1302), and the following procedure is changed depending on the kind of the function button. That is to say, the following procedures are different in case of the 'store' button for generating a new record and the 'delete' button for deleting a record and the 'forward record' and 'backward record' buttons for respectively reading record information of a forward record or a backward record.

In case the kind of the function button is the 'store' or 'delete' button, the following procedure is as follows. At first, the program searches data input sections in the interface form to check a table name used (step 1303), and then also checks which field name is used (step 1304). If the table name and the field name are checked, this information is used for generate a 'Into' clause included in an Insert or Update SQL statement and a 'From' clause included in a Delete statement (step 1305). And then, in case of the 'store' button, a value input by the user on the interface form is read to generate a 'Value' clause included in an Insert SQL statement and a 'Set' clause included in an Update SQL statement (step 1306). Finally, in order to generate a 'Where' clause, a field name designated by the primary key is searched (step 1307), then a 'Where' clause is generated by using the primary key (step 1308), and then the Insert, Update or Delete statement generation is completed (step 1309). The procedure from the step 1303 to the step 1309 is repeated as much as the number of tables. The SQL statement automatically generated as above is executed when the user clicks the function button or store the program module (step 1318).

After that, in case the kind of the function button is a 'forward record' or 'backward record', the following procedure is as follows. First, data input sections of the interface form are searched to check which field name is designated as a primary key (step 1310), and a 'Where' clause by using the searched primary key is generated (step 1311). A table name used in the data input section is searched to endow an alias to each table (step 1312), and a field list included in a Select statement is configured using the field name of the data input section (step 1313).

In addition, in case a specific data input section is set to refer to a field of another table and to be used as a foreign key, the corresponding connected field information is read to generate a 'Join' clause (step 1314). The 'join' clause and the table list prepared as above are used to generate a 'Form' clause (step 1315), and, in case a specific data input section is a basis for record arrangement, the corresponding information is also read to generate an 'Order-by' clause (step 1316).

After that, the parts generated in every step are associated to complete a Select SQL statement (step 1317). This SQL statement automatically generated as above is executed when the user clicks a function button or stores a program module (step 1318).

Figure 14:
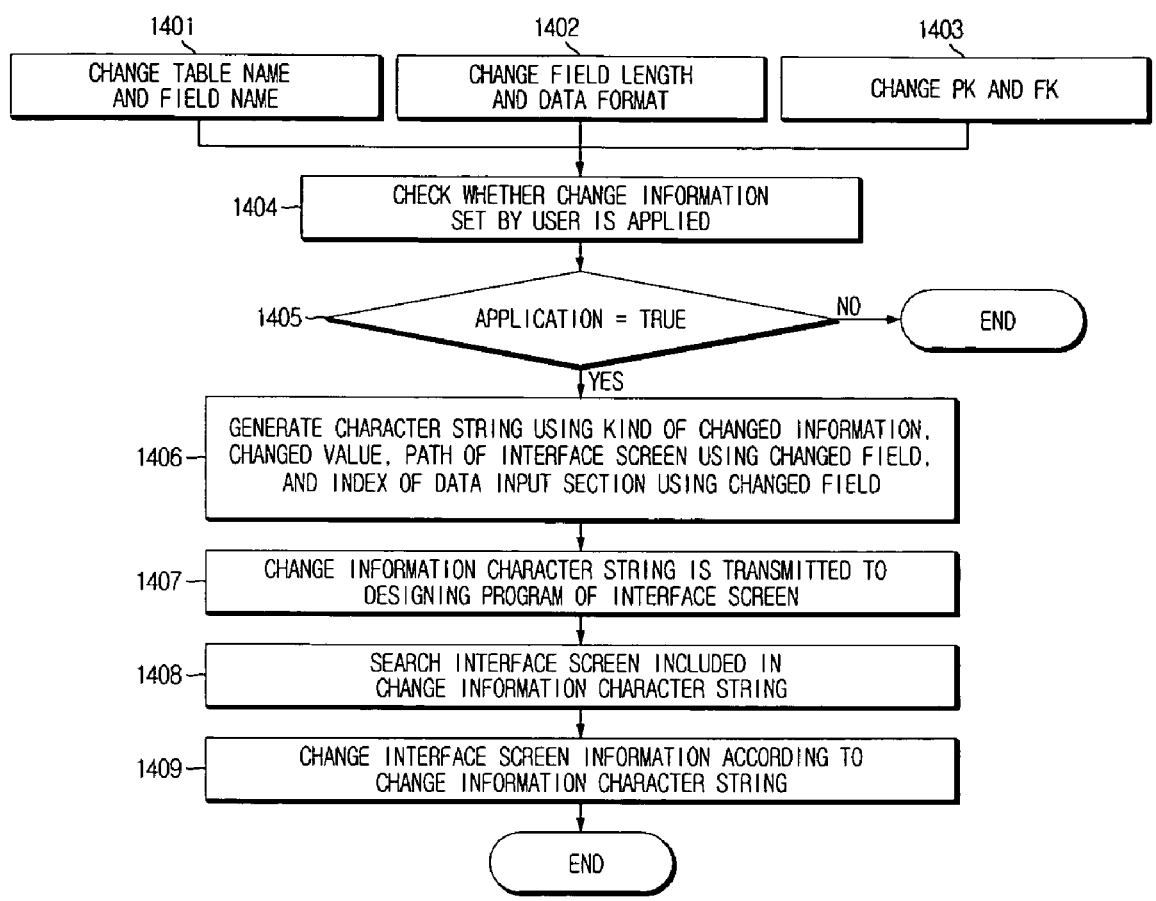
FIG. 14 shows a configuration of a program for automatically correcting an interface form or a code when changing ERD information according to the present invention.

FIG. 14 shows a configuration of the program for automatically correcting an interface form or a code in case of ERD information change, which is corresponding to the ERD and interface form synchronizing unit 311 of FIG. 3.

Referring to FIG. 14, in case a designer changes a table name, a field name, a field length, a data type, PK information or FK information (steps 1401, 1402 or 1403), the program plays a function of reflecting the changed information on the data input section of the interface form linked to the corresponding ERD. Of course, this program is operated only when the user sets ERD and the interface form to be automatically synchronized (step 1404).

In case there is an ERD change and the user sets to automatically apply the change to the interface form (step 1405), a character string is generated using the kind of changed information, a changed value, a path of the interface form using the changed field, and an index of the data input section using the changed field (step 1406). The change information prepared in a form of the character string is transmitted to the program for designing an interface form (step 1407), and the interface form designing program searches an interface form existing in the character string (step 1408) and automatically changes the setting information of the data input section according to the change information character string to synchronize ERD and the interface form (step 1409).

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

According to the present invention, when utilizing the development and the composing system (or, the authoring tool) proposed in the present invention so as to develop a computer program for business, configuration and function of a user interface that is considered as a final product is preferentially designed, so it is possible to minimize trial and error and other correction works during the developing procedure and also remarkably enhance productivity in implementing an execution program.

Differently from the prior art, the present invention is designed to enhance a production rate of software by developing the software in the order of i) input/output document designing, ii) automatic DB structure designing, and iii) automatic execution of coding work. That is to say, in the prior art, all program modules should be corrected and tested though a little change occurs in the DB structure. However, in the production method proposed by the present invention, after a final user interface form is designed by using the GUI manner, DB structure designing and coding works are all automatically conducted by help of the composing system. In addition, though any change occurs in the final user interface form, the work for detecting the change and then instantly changing the related DB structure and program code is automatically conducted, so it is possible to ensure improvement of a software production rate and easiness of maintenance.

In addition, each part of the software composing system (or, the authoring tool) provided by the present invention may be directly conducted by workers or business process experts having no professional development technique though it has been conventionally conducted only by programmers who have the software development technique, and also the present invention allows many works to be automatically executed together.

As described above, though the designing and demand analysis works has been conducted by work experts and the actual program developing works has been conventionally conducted by development technicians in the prior art, the present invention is improved so that persons having a capability of analyzing demands of users may conduct design and implementation of final products at the same time, thereby enabling to develop further user-oriented and practical software.

That is to say, it is possible to remarkably extend roles of functional ranges of process experts or persons who understand business logic though they could not develop a practical computer program for business in the prior art due to the lack of professional programming technique in spite of understanding business process that is an essential technique required for development of business software.

If a person who understands business logic plays a practical role in the essential process of the software production procedure as mentioned above, it is possible to reduce direct cost and time having been consumed for communication between the business experts and the development technicians in the conventional software development manner as well as trial and error and cost caused by communication errors, thereby capable of innovatively improving a software designing and producing rate.

What is claimed is:

1. A method for automating a software manufacturing process based on user interface form (or, input/output documents) design, which firstly designs a user interface form and then automates the manufacturing process of a software program by using design information of the user interface form in a reverse order, the method comprising:
   (a) generating the user interface form for the software program, the user interface form including an item name display section for displaying an item name of data to be input by a user using a graphic-user interface, a data input section for inputting data corresponding to the item name display section, and at least one function-discernible event button for managing database structure, as the graphic-user interface;
   (b) allowing the user to designate a database (DB) name and a table name for the user interface form, such that the data input through the user interface form is stored therein;
   (c) analyzing the user interface form and automatically extracting field design information of a table on the basis of the item name in the item name display section and a size of the data input section;
   (d) automatically generating an ERD (Entity Relationship Diagram) synchronized with the user interface form by automatically configuring a field structure of the table with reference to the table name and the field design information, as the graphic-user interface;
   (e) automatically composing and executing a SQL (Structured Query Language) statement for generating a database with reference to the field structure of the table displayed in the generated ERD so as to generate a physical database including the table; and
   (f) discerning a function of the function-discernable event button, automatically composing the SQL statement to be executed in linkage with an operation of the function-discernible event button, and automatically producing the software program which executes the SQL statement in linkage with the operation of the function-discernible event button.

2. The method for automating a software manufacturing process based on user interface form design according to claim 1, wherein the step (c) includes:
   (c1) allowing the user to designate a search direction and a search range of the item name display section on the basis of the data input section included in each interface form;
   (c2) extracting an item name written in the item name display section for each data input section by means of the designated search condition;
   (c3) designating the extracted item name as a field name or processing the extracted item name on the basis of a predetermined standard to be designated as a field name;
   (c4) calculating a size of the data input section to designate the size as a length of the field; and
   (c5) linking the data input section to the designated field name.

3. The method for automating a software manufacturing process based on user interface form design according to claim 2, wherein, in the step (c3), blank and special character are removed from the extracted item name so as to process the extracted item name.

4. The method for automating a software manufacturing process based on user interface form design according to claim 2, wherein, in the step (c4), kind and size of a current font are recognized for each data input section to calculate the number of letters capable of being input to the data input section, and then the number of letters is designated as the length of the field.

5. The method for automating a software manufacturing process based on user interface form design according to claim 1, wherein, in the step (b), a predetermined character string in the interface form selected by the user is designated as a table name.

6. The method for automating a software manufacturing process based on user interface form design according to claim 5, wherein the predetermined character string is a title of the interface form.

7. The method for automating a software manufacturing process based on user interface form design according to claim 1, further comprising:
   making addition, deletion or change in the item name display section and/or the data input section included in the user interface form by the user; and
   automatically reflecting the changed matter on the ERD.

8. The method for automating a software manufacturing process based on user interface form design according to claim 1, further comprising:
   adding or deleting a field of a specific table included in the ERD or changing name and/or attribute of a field by the user; and automatically reflecting the above change in a form of addition, deletion or change of the item name display section and/or the data input section on the user interface form related to the specific table.

9. The method for automating a software manufacturing process based on user interface form design according to claim 1, the function of the event button is one selected from the group consisting of data storing, data deletion, movement to forward record and movement to backward record, or their mixtures.

10. A computer-readable recording medium in which the method defined in any of the claims 1-6 and 7-9 is programmed and recorded.

* * * * *